US012711463B2

(12) United States Patent
Arafa et al.

(10) Patent No.: US 12,711,463 B2
(45) Date of Patent: Aug. 18, 2026

(54) SYSTEMS AND METHODS FOR AUTOMATING GENERATION OF INFORMATION TECHNOLOGY PROJECT ESTIMATES USING ARTIFICIAL INTELLIGENCE/MACHINE LEARNING TECHNIQUES

(71) Applicant: AT&T Intellectual Property I, L.P., Atlanta, GA (US)

(72) Inventors: Omar Arafa, Cliffwood, NJ (US); Donald Kevin Holcombe, Ball Ground, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 16 days.

(21) Appl. No.: 18/901,752

(22) Filed: Sep. 30, 2024

(65) Prior Publication Data

US 2026/0094122 A1 Apr. 2, 2026

(51) Int. Cl.
*G06Q 10/10* (2023.01)
*G06N 20/00* (2019.01)

(52) U.S. Cl.
CPC ........... *G06Q 10/103* (2013.01); *G06N 20/00* (2019.01)

(58) Field of Classification Search
CPC ............. G06Q 10/06; G06Q 10/06313; G06Q 10/103; G06Q 10/0631
See application file for complete search history.

(56) References Cited

U.S. PATENT DOCUMENTS

| | | | | |
|---|---|---|---|---|
| 7,559,049 | B1 * | 7/2009 | Hemmat .......... | G06Q 10/06375 717/102 |
| 2007/0276674 | A1 * | 11/2007 | Hemmat .............. | G06Q 10/101 705/300 |
| 2015/0310361 | A1 * | 10/2015 | Steele ....................... | G06F 8/20 717/101 |
| 2020/0057632 | A1 * | 2/2020 | Harsukhlal Sodha .... | G06F 8/70 |
| 2022/0058583 | A1 * | 2/2022 | Thompson ......... | G06Q 30/0214 |
| 2022/0357929 | A1 * | 11/2022 | Vijayaraghavan ... | G06N 3/0442 |

(Continued)

OTHER PUBLICATIONS

E. Ebrahim et al., "AI Decision Assistant ChatBot for Software Release Planning and Optimized Resource Allocation," 2023 IEEE International Conference on Artificial Intelligence Testing (AITest), Athens, Greece, 2023, pp. 55-60, doi: 10.1109/AITest58265.2023.00018. (Year: 2023).*

(Continued)

*Primary Examiner* — Johnna R Loftis
(74) *Attorney, Agent, or Firm* — Guntin & Gust, PLC; Miyoung Shin

(57) ABSTRACT

Aspects of the subject disclosure may include, for example, receiving a user query describing a new information technology (IT) project and a request for a desired action including obtaining an estimate of the new IT project, maintaining a knowledge repository that stores a data set relevant to IT projects, training an artificial intelligence/machine learning (AI/ML) model with a training data set which includes at least a subset of the data set relevant to IT projects, generating, using the trained AI/ML model, the estimate of the new IT project by using the knowledge repository, and returning the generated estimate of the new IT project as a response to the user query. Other embodiments are disclosed.

20 Claims, 12 Drawing Sheets

(56) References Cited

U.S. PATENT DOCUMENTS

2025/0265623 A1* 8/2025 Smith ................ G06Q 30/0283
2025/0315510 A1* 10/2025 Yarlagadda ............ H04L 51/02

OTHER PUBLICATIONS

Lee, Ghang. "A chatbot system for construction daily report information management." Proceedings of the International Symposium on Automation and Robotics in Construction (IAARC). 2019. (Year: 2019).*

Manchanda, S. (2021). Automation of Bid Proposal Preparation Through AI Smart Assistant. In: Sharma, N., Chakrabarti, A., Balas, V.E., Bruckstein, A.M. (eds) Data Management, Analytics and Innovation. Lecture Notes on Data Engineering and Communications Technologies, vol. 70, pp. 45-57. (Year: 2021).*

Stojiljkovic, Sara, Vladimir Obradović, and Marija Todorović. "Transformation of Project Management Through Intelligent Chatbot Tool." (2024). (Year: 2024).*

Joshi, Herat. "Artificial intelligence in project management: A study of the role of ai-powered chatbots in project stakeholder engagement." Indian Journal of Software Engineering and Project Management (IJSEPM) (2024). (Year: 2024).*

* cited by examiner

200

210

600

SYSTEMS AND METHODS FOR AUTOMATING GENERATION OF INFORMATION TECHNOLOGY PROJECT ESTIMATES USING ARTIFICIAL INTELLIGENCE/MACHINE LEARNING TECHNIQUES

FIELD OF THE DISCLOSURE

The subject disclosure relates to systems and methods for automating generation of information technology (IT) project estimates using artificial intelligence/machine learning techniques.

BACKGROUND

When starting a new IT project or enhancement to a set of applications, there is a significant amount of time spent identifying and determining estimates including cost estimation. For instance, a cost estimation process is led by project management teams and requires input and approval from various stakeholders and software delivery teams. The cost estimation process tends to be lengthy and can take weeks or months to complete. Additionally, outputs from the cost estimation process may be often found to be inaccurate and does not provide project management teams or finance teams a reliable amount to forecast. In addition to the cost estimation process, different aspects of the new IT project or enhancement such as human resource availability, physical resource availability, timelines pulled necessary resources, etc., may also need to be estimated.

FIG. 1 illustrates a conventional information technology (IT) project estimation flow which is manually performed. Information technology (IT) encompasses processes to create, process, store, secure and exchange all forms of electronic data using hardware, software, networking, etc. To some extent, IT is used in the context of business, commercial operations such as computer technologies, communication technologies, etc. The scope of IT includes communications, internet and web technologies, cloud computing, databases, artificial intelligence and machine learning, cybersecurity, Internet of Things, data analytics, etc.

The IT department ensures that enterprises'networks, applications, data, information and systems are connected and operate properly. The IT department performs tasks of deploying and maintaining applications, services and infrastructure such as servers, networks and storage. The IT department further performs tasks of monitoring, optimizing and troubleshooting IT resources and overseeing the security.

As shown in FIG. 1, a lead project manager works with application delivery teams and a portfolio manager with respect to a new IT project. When starting an enterprise IT project, a key activity is to identify project costs upfront. Estimated costs are used by project management teams to acquire appropriate funding from finance teams and determine a project schedule. As depicted in FIG. 1, this process of determining the associated estimate cost for IT work is often times a cumbersome process that involves engaging multiple delivery teams and subject matter experts. This process can take weeks or months to complete, and the output of this effort is often found to be inaccurate. Any modifications to the project's solution involves reworking and potentially restarting the lengthy estimation process. Additionally, the project cost estimation process is currently heavily dependent on key resources and subject matter experts from IT application teams. As the IT human resource supporting these applications may be no longer available, by departing a company, moving a team, retiring, etc., reliance on these subject matter experts becomes unstable due to organizational knowledge loss, and at the same time, reliance on inexperienced resources can potentially lead to errors in the cost estimation process and require additional re-work.

Within technology companies, the IT project cost estimation process is driven through estimates that are compiled during different phases of the project. As depicted in FIG. 1, during a first phase of a project, a Model Driven Estimate (MDE) is compiled based on an initial technical solution. The MDE is primarily utilized to develop funding estimates for IT level business cases by using a level of effort estimation and corresponding rate cards.

In later phases of the project, a Delivery Driven Estimate (DDE) is compiled by application delivery teams. The DDE is utilized to provide a more granular and accurate representation of costs associated with the IT development work. The DDE is reviewed by the lead project manager and the portfolio manager, as depicted in FIG. 1 and utilized to fund the IT project and determine a project delivery schedule.

When compiling the MDE, multiple reviews are required with impacted application delivery teams to determine an estimated level of effort associated with the IT development work. After the solution documentation is reviewed with each impacted delivery team, an MDE estimate is calculated by the project manager based on the estimated level of effort. The level of effort is utilized as input within homegrown project management tools, and the associated cost rates are utilized by the tool to produce an estimate. This process of producing the MDE is a lengthy process that requires multiple reviews with various delivery teams and reviews with portfolio managers. This MDE process may also be inaccurate. The MDE is intended to be used to plan and fund business cases; however, the inaccurate nature of the MDE does not empower the technology companies to make proper decisions when funding critical IT projects.

The DDE is compiled during subsequent phases of the project. The DDE is determined and calculated by each delivery team associated with the project. This effort is led internally within each delivery team. As part of this effort, technical solutions and requirement documentation are utilized to compile an associated effort and cost. The outputs of this are reviewed by the project Manager and portfolio Manager, and the estimate is utilized to fund the project and determine a project delivery schedule. This DDE process is lengthy, and the delivery teams within technology companies currently have a 3-week Service Legal Agreement (SLA) for determining and entering the DDE. Coordination across the DDE process is a manually intensive process that requires the project manager to frequently communicate with the delivery teams. Although it is more accurate than the MDE, the DDE may also be fairly inaccurate. The accuracy rate of the DDE is plus or minus 20%. During the technical review in the DDE process, revisions are often identified to project's solution. These revisions to the project's solution often times involve reworking and potentially restarting the lengthy estimation process. Additionally, the DDE process is currently heavily dependent on key resources and subject matter experts from IT application teams.

BRIEF DESCRIPTION OF THE DRAWINGS

Reference will now be made to the accompanying drawings, which are not necessarily drawn to scale, and wherein.

DETAILED DESCRIPTION

Figure 1:
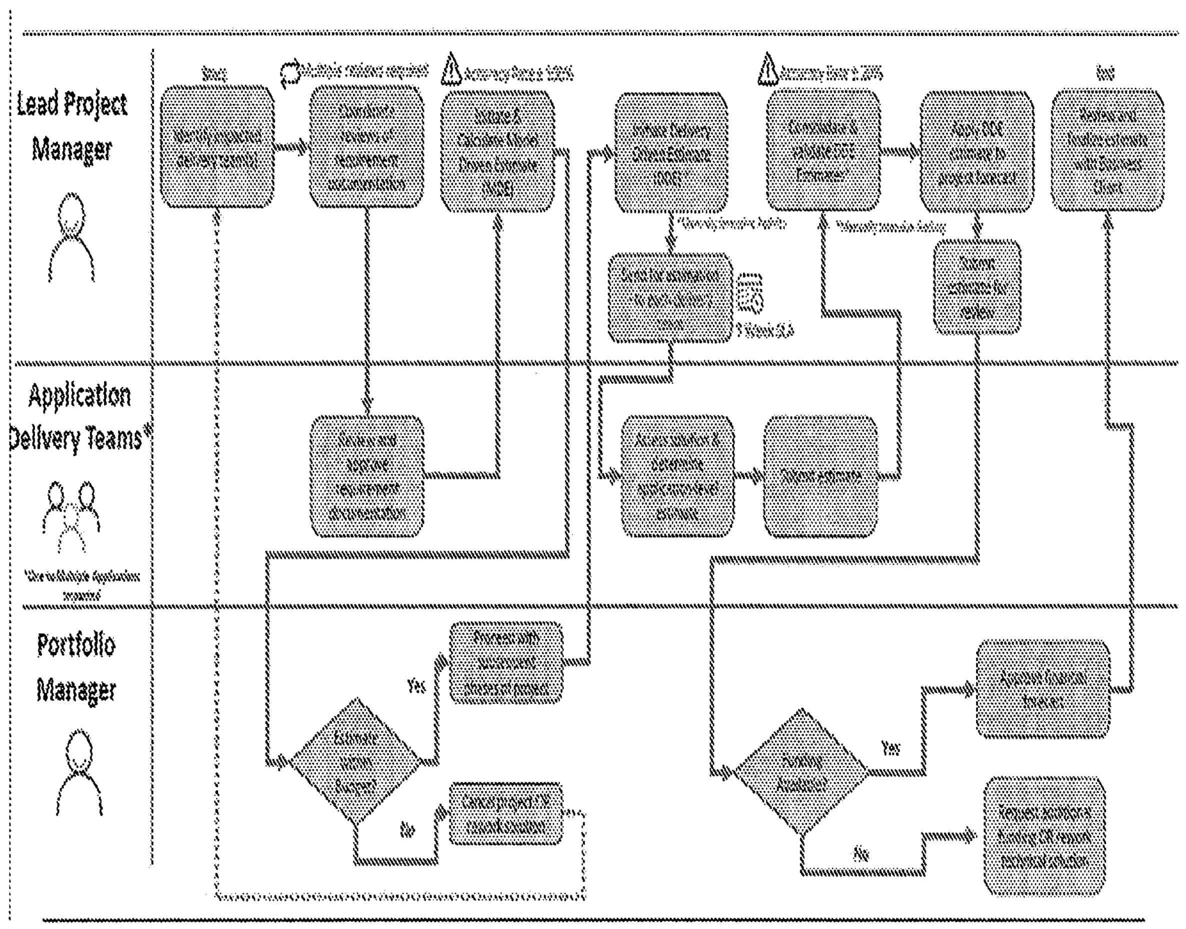
FIG. 1 illustrates a conventional IT project estimation flow manually performed.

The subject disclosure describes, among other things, illustrative embodiments for systems and methods for automating generation of information technology (IT) project estimates using artificial intelligence/machine learning (AI/ML) techniques. More specifically, the systems and methods utilize large language models (LLMs) to automate the generation of the IT project estimates in response to a user query in a natural language form. The LLMs are configured to perform information retrieval and documents search from a knowledge repository containing system information, requirement documents, historical information and/or financial information. The LLMs are further configured to generate the IT project estimates which are provided as a response to the user query. Other embodiments are described in the subject disclosure.

One or more aspects of the subject disclosure are directed to a device including a processing system having a processor and a memory that stores executable instructions that, when executed by the processing system, facilitate performance of operations. The operations include receiving a user query describing a new information technology (IT) project and a request for a desired action, wherein the desired action includes obtaining an estimate of the new IT project; maintaining a knowledge repository that stores a data set relevant to IT projects, wherein the data set relevant to IT projects includes at least system information, requirement documentation, financial information, and historical information; training an artificial intelligence/machine learning (AI/ML) model with a training data set which includes at least a subset of the data set relevant to IT projects; generating, using the trained AI/ML model, the estimate of the new IT project by using the knowledge repository; and returning the generated estimate of the new IT project as a response to the user query.

One or more aspects of the subject disclosure are directed to a non-transitory machine-readable medium, comprising executable instructions that, when executed by a processing system including a processor, facilitate performance of operations. The operations include receiving a user query describing a target information technology (IT) project and a request for a desired action, wherein the user query contains a plurality of parameters and the desired action includes an instruction to obtain an estimate of the target IT project; maintaining a knowledge repository that stores a data set relevant to IT projects, wherein the data set relevant to IT projects contains information matching with the plurality of parameters; in response to the user query, generating, using a large language model, the estimate of the target IT project by accessing the knowledge repository; and returning the generated estimate of the target IT project as a response to the user query.

One or more aspects of the subject disclosure are directed to a method including receiving, by a processing system including a processor, a user query describing a target information technology (IT) project and a request for a desired action, wherein the user query contains a plurality of parameters and the desired action includes a request for an estimate of the target IT project; maintaining, by the processing system, a knowledge repository that stores a data set relevant to IT projects, wherein the data set relevant to IT projects contains information matching with the plurality of parameters; in response to the user query, generating, by the processing system, using an artificial intelligence/machine learning (AI/ML) model, the estimate of the target IT project by accessing the knowledge repository; and providing, by the processing system, the generated estimate of the target IT project as a response to the user query.

Figure 2A:
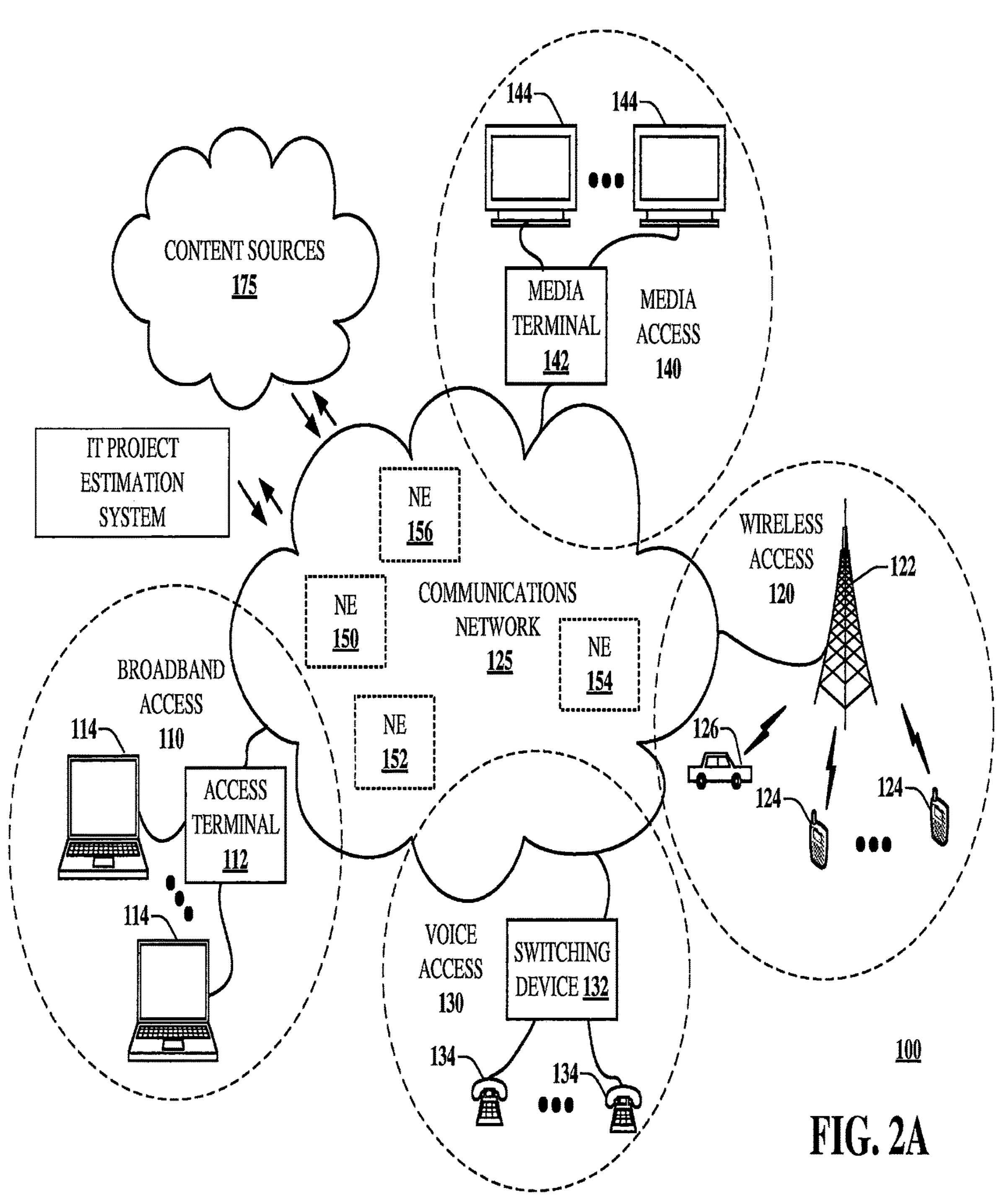
FIG. 2A is a block diagram illustrating an exemplary, non-limiting embodiment of a communications network in accordance with various aspects described herein.

FIG. 2A is a block diagram illustrating an example, non-limiting embodiment of a system 100 in accordance with various aspects described herein. For example, system 100 can facilitate in whole or in part systems and methods for automating generation of information technology (IT) project estimates using artificial intelligence/machine learning techniques. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132, media access 140 to a plurality of audio/video display devices 144 via media terminal 142 and/or an IT project estimation system. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2B:
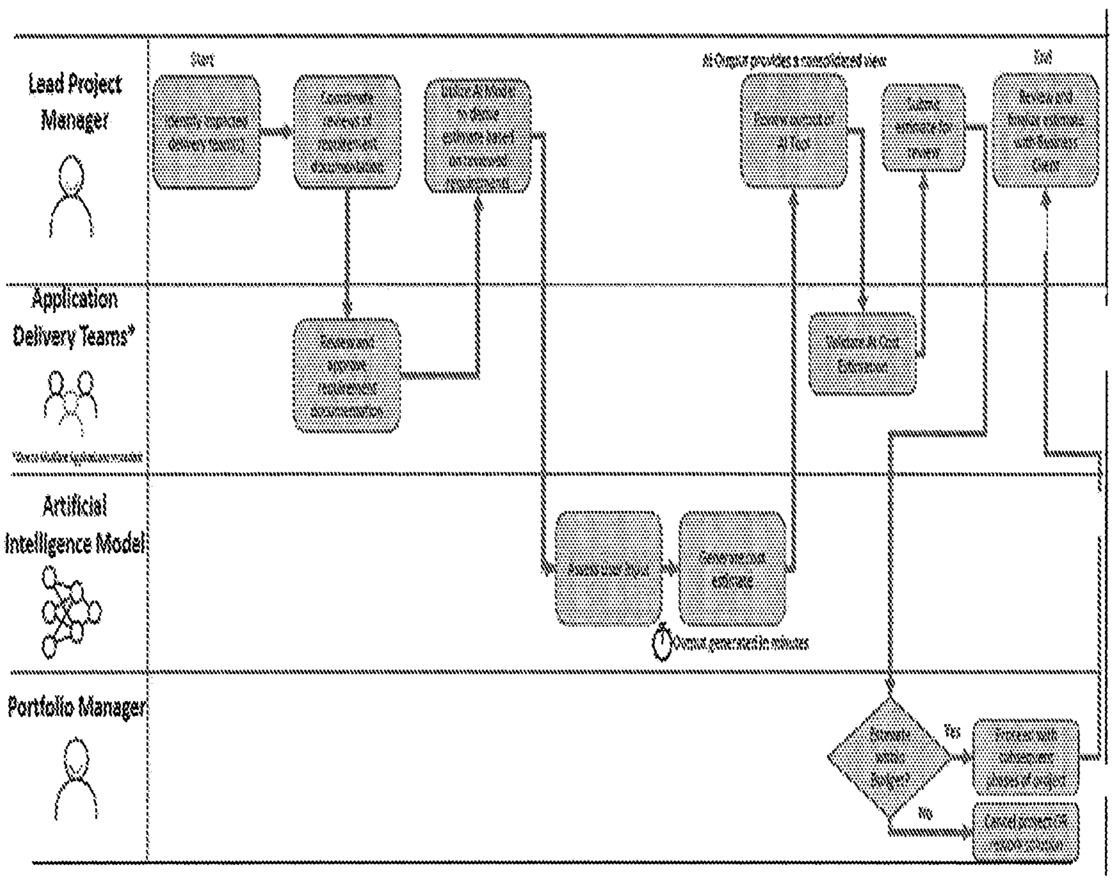
FIG. 2B depicts an illustrative embodiment of an IT project estimation process using artificial intelligence/machine learning (AI/ML) techniques in accordance with various aspects described herein.

FIG. 2B depicts an illustrative embodiment of an IT project estimation process 200 using artificial intelligence/machine learning (AI/ML) techniques in accordance with various aspects described herein.

Artificial intelligence (AI) is implemented with computer systems capable of performing tasks normally requiring human intelligence. Machine learning (ML) is a subfield of artificial intelligence which is a program or a system that trains a model and gives a computer ability to learn. Supervised ML models utilize labeled data with tags and unsupervised ML models utilize unlabeled data such as raw data. Deep learning is a subset of ML and uses neural networks, allowing the neural networks to process more complex patterns than traditional ML. Generative AI is a subset of deep learning which uses neural networks and process labeled data and unlabeled data. Large language models (LLMs) are a subset of deep learning. Deep learning model types are discriminative and generative. The discriminative type AI is used to classify or predict and trained on a dataset of labeled data. The generative type AI generates new data that is similar to data it was trained on and predicts next word in a sequence. The generative type AI generates new content such as natural language, image, audio, etc.

The generative type AI (GenAI) takes inputs of training codes, labeled data and unlabeled data and builds a foundation model. The foundation models are pretrained with vast quantity of data and are designed to be fine-tuned to perform many downstream tasks, such as question answering, sentiment analysis, information extraction, etc. The foundation model can generate new content such as text, code, image, etc. GenAI creates new content based on learning from existing content through training and results in the creation of a statistical model. In response to a prompt, GenAI uses this statistical model to predict a response to be generated as new content. For instance, generative language models learn about patterns in language through training data and in response to some text, next word is predicted. LLMs are one example of generative language models. Generative language models utilize pattern matching and show a list of high probability results.

Generative language models utilize a transformer including encoding component and decoding component. The decoded input by the transformer is provided to a generative pre-trained transformer model which generates an output.

One use case of generative language models including the LLM are training generative language models to perform a specific task or action based on text input. The task can be a wide range of actions such as answering a question, performing a search, making a prediction, etc. and such use case applications include, for example, virtual assistants, automation, etc.

Domain knowledge in ML refers to expertise and understanding of a specific field or subject matter to which a ML model is applied. The integration of LLMs into specialized domains like IT, medicine, law, and finance expands the boundaries of application of ML in these fields. LLMs are equipped with the necessary domain-specific knowledge and reasoning abilities. General-purpose LLMs are available to cover general knowledge and language tasks, but general-purpose LLMs may lack the depth and nuance required for specialized fields. Domain knowledge can be supplemented by adding domain-specific knowledge and training LLMs on data reflecting such domain-specific knowledge.

Prompt is a short message of text that is given to a large language model (LLM) as an input. The quality of input through the prompt determines the quality of output of the LLM. Prompt may control the output of the LLM. Components of a prompt may include a task, system instructions, few-shot examples, and/or contextual information. Prompt engineering involves crafting questions or prompts that guide the ML model such as the LLM to generate outputs tailored to a specific domain. Prompt engineering operates to extract domain-specific knowledge from a generic LLM without modifying its architecture or undergoing retraining. Accordingly, prompt engineering aims to optimize the entire ML system to ensure reliable, efficient, and safe performance. Thus, prompt engineering is the technical, model-centric discipline focused on optimizing the prompts and instructions to elicit desired outputs from the underlying AI system. Prompt engineering is concerned with the AI model itself, while prompt design, which will describe below, is concerned with how users interface with and utilize that AI model through natural language interactions. In other words, prompt engineering refers to the technical process of crafting the specific language and instructions used to elicit desired outputs from AI models. This involves careful consideration of factors like word choice, structure, tone, and context to optimize the model's response. The goal of prompt engineering is to precisely specify the task at hand and guide the AI system to provide the most relevant, accurate, and useful information.

Prompt design focuses on crafting effective prompts and involves formulating clear, effective instructions or queries that guide AI language models to generate accurate and relevant responses. Effective prompt design is crucial for obtaining desired outputs and avoiding biases or misleading information from AI models. As described above, while prompt engineering is focused on the technical implementation and design of the ML model, prompt design is centered on user experience. For instance, prompt engineering is for use in the implementation and design of the AI model, and prompt design is for use with chatbots. Prompt design, on the other hand, is the user-centric practice of crafting prompts that provide a seamless and intuitive experience when interacting with AI-powered chatbots and assistants. The emphasis is on the user experience rather than just model performance. Prompt design involves considering the natural flow of human-AI interaction, anticipating user needs and constraints, and crafting prompts that seamlessly integrate the AI assistant into the user's tasks and objectives. The emphasis of prompt design is on creating prompts that feel intuitive, conversational, and aligned with the user's mental model.

Referring back to FIG. 2B, in various embodiments, the IT project estimation process 200 is directed to implementation and use of an AI/ML tool in the cost estimation process, which can greatly improve and streamline IT project planning activities. The AI/ML tool can be used to ingest project artifacts, delivery team cost rates, past financial estimates, and past project actuals to derive an accurate representation of costs associated with a project. Use of this AI/ML tool will help reduce a margin of error associated with compiling project estimates. Use of the AI/ML tool will help drive towards a consistent estimation model that will empower IT project management and finance teams to make data driven decisions when kicking off projects. With the AI/ML tool deriving an accurate representation of IT project costs, the finance teams will be able to better allocate and forecast funding for critical IT projects. Additionally, the AI/ML tool will provide a competitive advantage through improving time to market by reducing the startup times for projects.

In various embodiments, the IP project estimation process 200 involves a lead project manager who initiates the estimation process. The lead project manager identifies impacted application delivery teams and coordinates reviews of requirement documentation with the identified application delivery teams. Upon notification by the lead project manager, the application delivery teams review and approve the requirement documentation. After receiving approval by the application delivery teams, the lead project manager utilizes an artificial intelligence/machine learning (AI/ML) tool to derive estimates based on the reviewed requirements.

As depicted in FIG. 2B, the AI/ML tool utilizes one or more machine learning techniques available in the art. As one example, the AI/ML tool may be based on a large language model which operates based on instructions such as a prompt. The AI/ML tool will be described more in detail below in connection with FIGS. 2C and 2D. The lead project manager provides inputs to the AI/ML tool and as an output, the AI/ML tool generates cost estimates promptly, for example, in minutes. The generated cost estimate is provided to the lead project manager for a review. After the review by the lead project manager, the AI generated cost estimation is validated by the application delivery teams.

Upon verification and validation by the lead project manager and the application delivery teams, the estimate is submitted for review by a portfolio manager who checks and determines whether the estimate is within a budget for the new IT project. If the estimated cost is within the budget, then the portfolio manager proceeds the new IT project to go on with subsequent phases of the project. If the estimated cost is not within the budget, then the portfolio manager may cancel the new IT project or consider reworking solutions. After receiving approval by the portfolio manager, the lead project manager reviews and finalizes the estimate with a business client.

Referring back to FIG. 2B, by using the AI/ML tool, the estimation process 200 can be significantly simplified and automated. For instance, the MDE and the DDE and associated processes depicted in FIG. 1 may not be needed and thus, can be omitted in the estimation process 200 as depicted in FIG. 2B. Tasks required by the involved human resources such as the lead project manager, the application delivery teams, and the portfolio manager can be significantly reduced which can free up their times and resources for performing their primary tasks. This is primarily because the AI/ML tool receives user input, processes the user input and generates cost estimates substantially in real time. As described above, the user input is provided as a prompt to a LLM which is trained to understand the user input in natural language and search/review a domain having specific knowledge in order to generate a response to the user input.

Figure 2C:
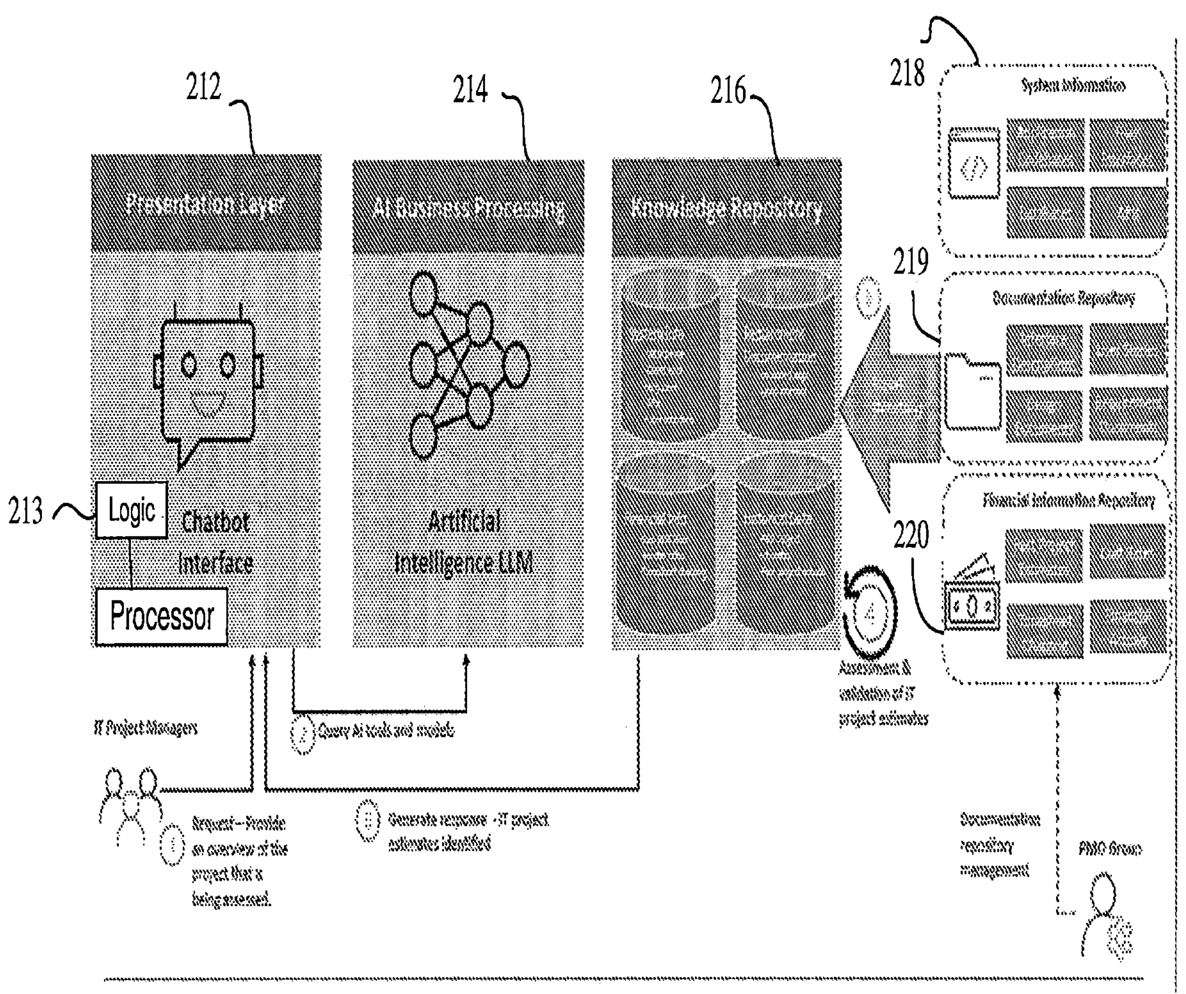
FIG. 2C is a block diagram illustrating an example, non-limiting embodiment of a system functioning within the communication network of FIG. 2A in accordance with various aspects described herein.

FIG. 2C is a block diagram illustrating an example, non-limiting embodiment of a system 210 functioning within the communication network of FIG. 2A in accordance with various aspects described herein. In various embodiments, the system 210 is not limited to the communication network of FIG. 2A and can be used in other IT systems and networks. The system 210 implements the IT project estimation process 200 shown in FIG. 2B. In various embodiments, the system 210 includes a presentation layer 212, an artificial intelligence (AI) system 214, and a knowledge repository 216. The system 210 automates an estimation process by including and utilizing the AI system 214. The presentation layer 212 implements a chatbot interface by way of example. As one example, an IT project manager needs to initiate a new IT project and desires to initiate a request for generating an estimation of the new IT project. The IT project manager provides an overview of the new IT project that is being assessed. For instance, the IT manager starts sending the request for generating the estimation of the new IT project by activating objects on a graphical user interface available to the IT manager. The IT project manager may be presented with a chatbot interface which requires and at the same time, guides the IT project manager to input data with respect to the new IT project. The presentation layer 212 includes predetermined logics 213 which, upon execution by a processor, prompt queries to the IT project manager in order to collect data necessary and relevant to the new IT project. As described above, the chatbot interface is one example of prompt design which facilitates assistance for users in order to use prompts that feel intuitive, conversational, and aligned with the user's goal of obtaining accurate estimates of the new IT project.

In various embodiments, once the presentation layer 212 receives the input data necessary and relevant to the new IT project via the chatbot interface, the processor generates a prompt or instructions for the AI system 214 based on the input data. The generation of the prompt or instructions for the AI system 214 may be automated which is transparent to the IT project manager. In other words, once the IT project manager provides responses to the queries via the chatbot interface, proper prompt or instructions are generated as a result by the processor using the logic 213 in the presentation layer and are provided to the AI system 214. Such automated process may facilitate the prompt design for generating consistent and proper prompt or instructions with respect to the same information relating to the new IT project. Additionally or alternatively, the IT project manager can be presented with a different channel to input a prompt or instructions directly to the AI system 214 without using the chatbot interface.

The prompt corresponds to instructions or a query to the AI system 214 in order to generate a response indicative of estimation of the new IT project. The AI system 214 is trained and use information stored in the knowledge repository 216. In some embodiments, the AI system 214 may be a pre-trained foundation model with vast quantity of general knowledge. The pre-trained foundation model can be used as the AI system 214 with adaptation or fine-tuning as needed in order for the AI system 214 to learn about the IT estimation process. In other embodiments, the AI system 214 may be a pre-trained specific model based on domain specific knowledge, such as IT estimation directed knowledge domain.

In various embodiments, the knowledge repository 216 provides a universe of information that the AI system 214 is trained to understand and learn therefrom. The knowledge repository 216 can be a part of domain having general knowledge or a standalone repository. The knowledge repository 216 includes system information, requirement documentation, financial information and historical data by way of example. The knowledge repository 216 can be configured to add or delete more information as needed and is not limited to the information as depicted in FIG. 2C. As one example, the system information include information relating to database schema, client applications, application codes, application programming interfaces (APIs), and user interface. As another example, the requirement documentation includes impacted applications and level of effort. As further another example, the financial information includes application cost rates, vendor rates, timesheet charging, etc. As yet another example, the historical data include past project estimates, past project actuals, etc.

In various embodiments, a project management organization (PMO) performs documentation repository management. For instance, the PMO group, periodically or per a predetermined schedule, provides system information 218, documentation repository 219 and financial information repository 220. The information loaded in each repository is ingested into the knowledge repository 216 on a regular basis such as on a monthly schedule. As depicted in FIG. 2C, the system information 218 includes, without being limited to, application codebases, user interfaces, databases, APIs, etc. The documentation repository 219 includes interface descriptions, user stories (e.g., description of the new IT project), design documents, requirement documents (e.g., required quality of service, subscription information, performance thresholds, etc.). The financial information repository 220 includes past project estimates, cost rates, timesheet charging information, financial actuals data, etc.

In various embodiments, the AI system 214 is trained to use, as input data, user queries having certain parameters identifying IT projects and essential items of IT project estimates. Additionally, the AI system 214 is trained to use, as input data, a plurality of past IT project estimates. Based on the training, the AI system 214 learns and extract, utilizes and/or searches the information stored in the knowledge repository 216 in order to predict or forecast or generate a response to a query inputted into the AI model 214 with respect to the new IT project.

In various embodiments, the system 210 automates the estimation process including the AI system 214 that leverages past project estimates and requirement documentation to generate cost estimates for the new IT projects. As most IT projects may aim to leverage or reuse existing application software, the information from past projects can be leveraged by the AI system 214 to develop a substantially accurate estimate for the new IT project. Additionally, or alternatively, the past projects and information therefrom can serve as accurate, relevant templates and associated information in generating new estimates for new IT projects. By way of example only, the AI system 214 may derive an output based on past experiences with a similar type of project impact. The AI system 214 may process the following information that is maintained within the knowledge repository 216 as depicted in FIG. 2C:

- Previous project financial information (previous project estimates, financial actuals, timesheet charging, project overhead costs, delivery team cost rates).
- Previous project documentation (solution documentation, user stories, technical design documents, interface descriptions).
- Application/System information (access to application codebases, user interfaces, databases, APIs).

The AI system 214 accesses and processes this repository 216 of information configured as a specific knowledge domain, thereby generating estimates without much delay. This may make it possible to provide use cases that IT project managers can quickly determine an estimate of projected effort and costs by asking the AI integrated chatbot questions regarding the project impacts.

In various embodiments, the following are a few exemplary details included in estimates generated from the AI system 214:

- The estimated time and effort to develop a target application software. This includes a derivation of a number of software developers and a number of hours required to support certain tasks.
- The estimated time and effort required to test a target application software. This includes a derivation of a number of software testers and number of hours required to support certain testing tasks.
- An estimation of overhead costs required for including specific applications and vendors within projects.
- Provide a list of expected/potential technical enhancements for the new IT project.

The estimation generated by the AI system 214 can be used by the application delivery teams to validate estimates and guide the delivery teams on the design and implementation of the project, as depicted in FIGS. 2B and 2C.

In various embodiments, the AI system 214 is a generative AI system which can learn from training based on given estimation data and generate new estimation data with respect to new IT projects. As described above, the AI system 214 utilizes data provided in the knowledge repository 216 and performs AI-driven data analysis, comparison and prediction based on the available data after the training phase and learned from training data. The AI system 214 may select and utilize AI models currently available in the art. For instance, the AI system 214 may contain a large language model (LLM) which provides natural language processing and data analysis. By way of example, the LLM uses transformer models that are able to learn context of natural language sentences. User queries may take a form of natural language and be provided as a prompt to the LLM. This allows the LLM to interpret natural language. Formats of resulting estimation by the AI system 214 can be configured based on a need and preferences by the IT project managers and coordinating teams. For instance, the AI system 214 can be configured to present the estimation in certain formats using graphs, tables, displaying certain pieces of information, etc.

Figure 2D:
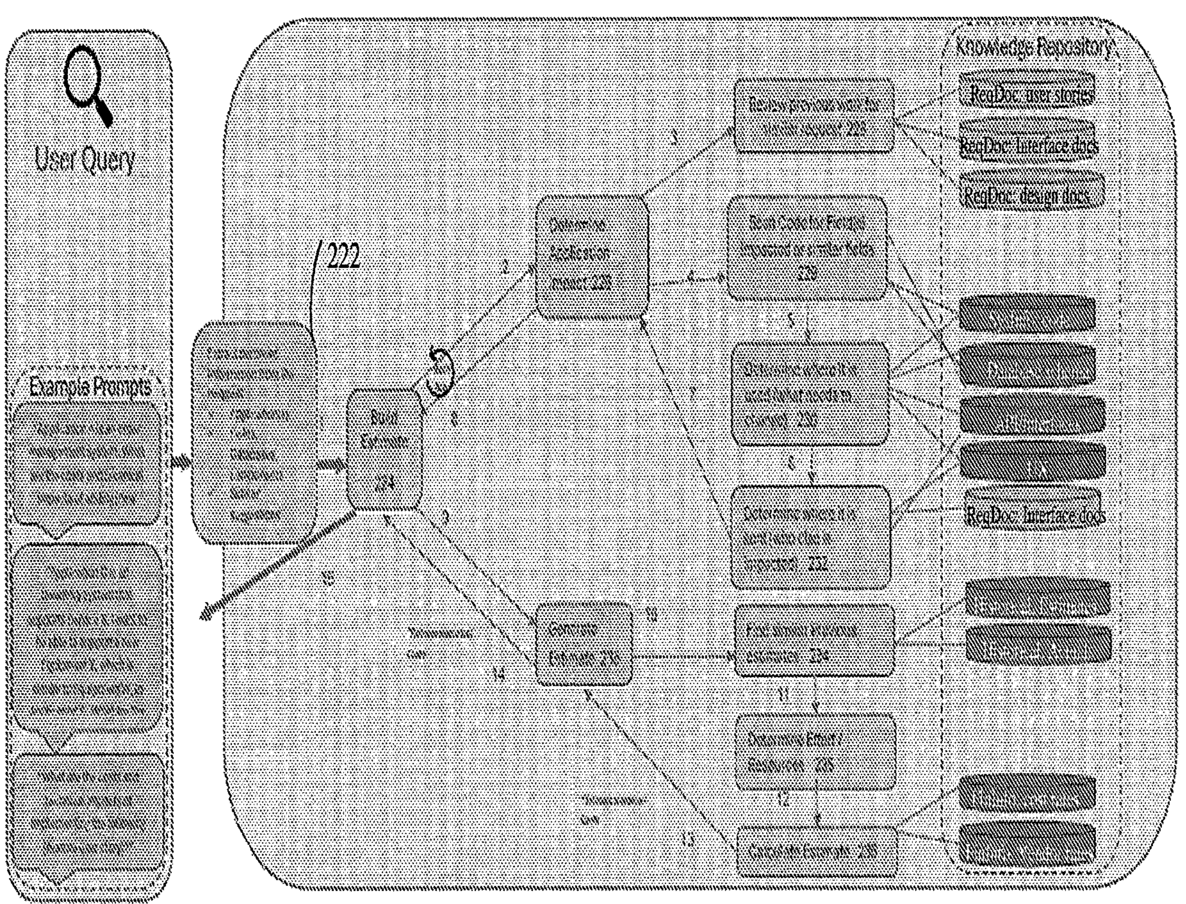
FIG. 2D depicts an illustrative embodiment of processing of an IT project estimation process using artificial intelligence/machine learning (AI/ML) techniques in accordance with various aspects described herein.

FIG. 2D depicts an illustrative embodiment of processing of an IT project estimation process using artificial intelligence/machine learning (AI/ML) techniques in accordance with various aspects described herein. In various embodiments, a user input of prompt is provided via a user interface such as a chatbot application. The prompt should include context details related to the new IT project or technology and desired actions of the AI system 214. The user input is in a natural language form. By way of example only, prompt examples are as follows:

Application A is an order management system. What are the costs and technical impacts of adding [new values] to the field X in Application A?"

"Application C is an inventory system that supports Service B. I want to be able to support a new Equipment Y, which is similar to Equipment W, in Application C. What are the costs and technical impacts of adding a new type of equipment in Application C?"

"What are the costs and technical impacts of implementing the following [feature user story]?"

A user story describes briefly and informally a product feature or a service feature. A user story may be frequently used in project management and software developments. User stories may follow certain formats such as reciting a user, a goal to achieve, and/or steps to achieve the goal. When user stories are provided, a project team discusses user stories and how to achieve the goal, for instance.

In various embodiments, the prompt or instructions are provided to the AI system 214 (shown with Arrow "1") using the large language model which extracts pertinent information from the prompt or instructions (222). As described above, the LLM includes encoding and decoding components which enable understanding of natural language. The prompt contains a task such as "what are costs and technical impacts of doing [the description of the new IT project]"? The LLM performs the task of building an estimate (224), as shown with Arrow "2." By way of example, the extracted pertinent information from the user input may include application(s), fields, databases, components, similar suggestions that have been made in the past, etc. Based on the pertinent information, several steps for building the estimate follow. It is determined which application(s) may be impacted (226). Once application(s) to be impacted are identified, the LLM searches, identifies and reviews previous works for similar requests (228), scans codes for field(s) impacted or similar fields (229), determines where it is used and/or what needs to be changed (230), as shown in Arrows associated with numerals 3, 4 and 5. Additionally, it is determined where it is sent and who else may be impacted (232), as shown in Arrow 6.

In various embodiments, the code for field(s) impacted or similar fields, where it is used and/or where it is sent and who else may be impacted (229, 230, 232) are fed back to the determination of the application(s) impacted at 226, as shown with Arrow 7. This information is used in building the estimate at 224 (as shown with Arrow 8), which will in turn be used in generating the estimate (238) (as shown with Arrow 9). The generated estimate is checked and compared against similar previous estimates (234) (as shown with Arrow 10). Efforts and resources used in the similar previous estimates are reviewed (235) as shown with Arrow 11, and considered before the estimate is calculated (236) as shown with Arrow 12. Any modification identified and needed in light of the similar previous estimates may be reflected in the calculated estimate (238), as shown with Arrow 13. The same information may be passed to the process of building the estimate (224), as shown with Arrow 14. The generated estimate is provided to users as a response (Arrow 15).

In various embodiments, as depicted in FIG. 2D, the information stored in the knowledge repository is correlated with and utilized in the estimation generation process, as depicted in FIG. 2D. For instance, the requirement documentation including user stories, interface documents and design documents are reviewed in order to review the previous work for similar requests. The system information containing codes, database schema, API/interfaces, and user interfaces are reviewed to determine the code for field(s) impacted or similar fields, where it is used and/or where it is set and who else may be impacted (229, 230, 232). Additionally, the interface documents are also used to determine where it is sent and who else is impacted.

In various embodiments, similar previous estimates (234) can be reviewed and compared based on historical project estimates and project actuals. Financial information containing cost rates and vendor rates are reviewed and compared in the calculation of estimates (236). As a result, the resulting estimate is provided to users in response to a query. For instance, the resulting estimate passes an application list with impacts containing areas expected to be changed, modules, interfaces, database, user interfaces, delivery scenarios and costs (e.g., ±50%). Previous similar projects are taken into account for the estimates.

Figure 2E:
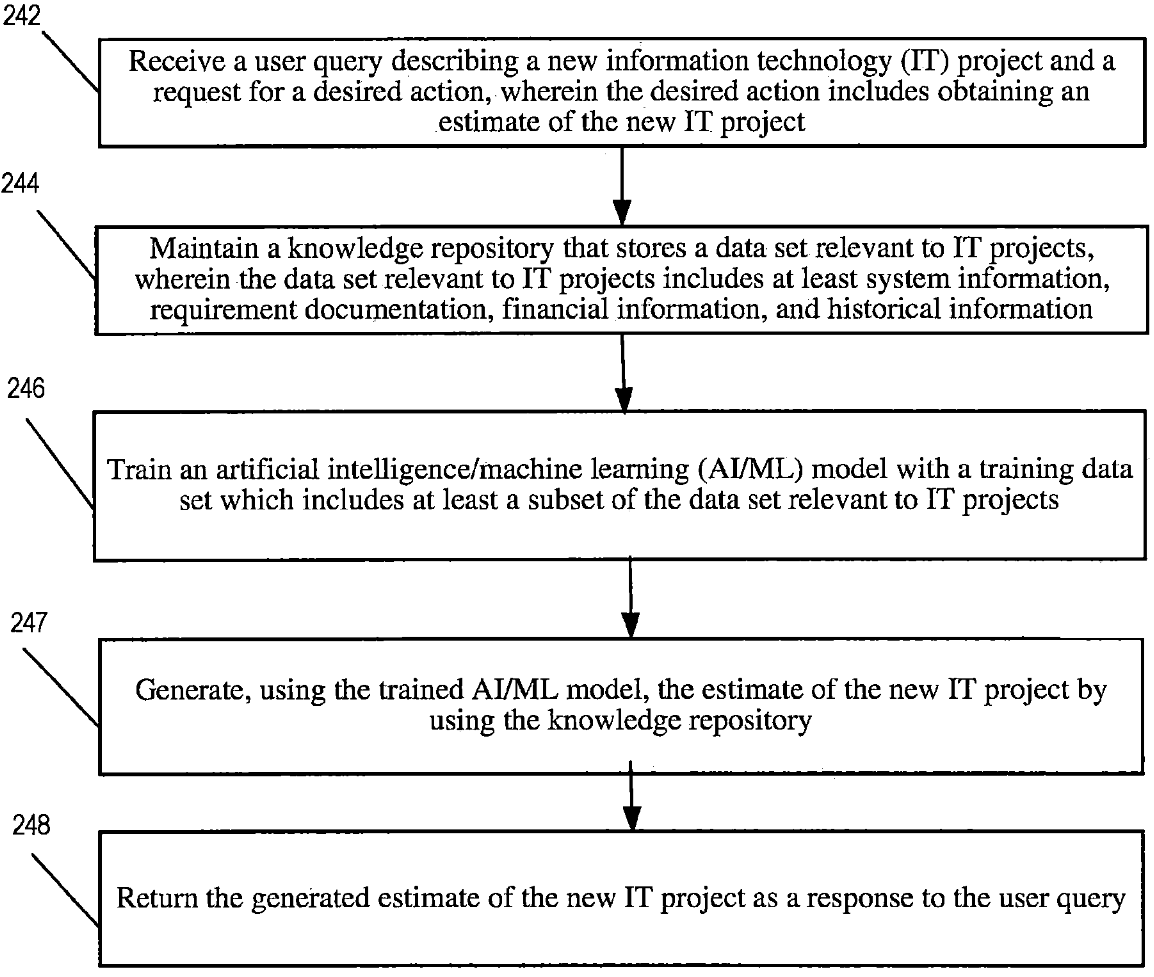
FIG. 2E depicts an illustrative embodiment of a method in accordance with various aspects described herein.

FIG. 2E depicts an illustrative embodiment of a method 240 in accordance with various aspects described herein. In various embodiments, the method 240 includes receiving a user query describing a new information technology (IT) project and a request for a desired action, wherein the desired action includes obtaining an estimate of the new IT project (Step 242), maintaining a knowledge repository that stores a data set relevant to IT projects, where the data set relevant to IT projects includes at least system information, requirement documentation, financial information, and historical information (Step 244), training an artificial intelligence/machine learning (AI/ML) model with a training data set which includes at least a subset of the data set relevant to IT projects (Step 246), generating, using the trained AI/ML model, the estimate of the new IT project by using the knowledge repository (Step 247), and returning the generated estimate of the new IT project as a response to the user query (Step 248).

In various embodiments, the system information comprises information relating to database schema, client applications, application codes, application programming interfaces (APIs), user interfaces or a combination thereof. The generating the estimate of the new IT project further comprises determining one or more applications impacted in the new IT project based on the system information. The requirement documentation further comprises user stories, interface documents, design documents, interface documents, or a combination thereof, and the historical information further comprises historical project estimates and historical project actuals. The generating the estimate of the new IT project further comprises (i) identifying prior IT projects having a first predetermined similarity threshold to information included in the requirement documentation and reviewing tasks having performed in the identified prior IT projects, and (ii) identifying and reviewing prior estimates of the IT projects having a second predetermined similarity threshold to information included in the historical information.

In various embodiments, the financial information comprises cost rates and vendor rates, and the generating the estimate of the new IT project further comprises calculating the estimate of the new IT project based on information included in the financial information. The user query is in a natural language form and the AI/ML model comprises a large language model. The receiving the user query further comprises receiving the user query via a chatbot interface such that a prompt to the AI/ML model is automatically generated by a chatbot application.

Figure 2F:
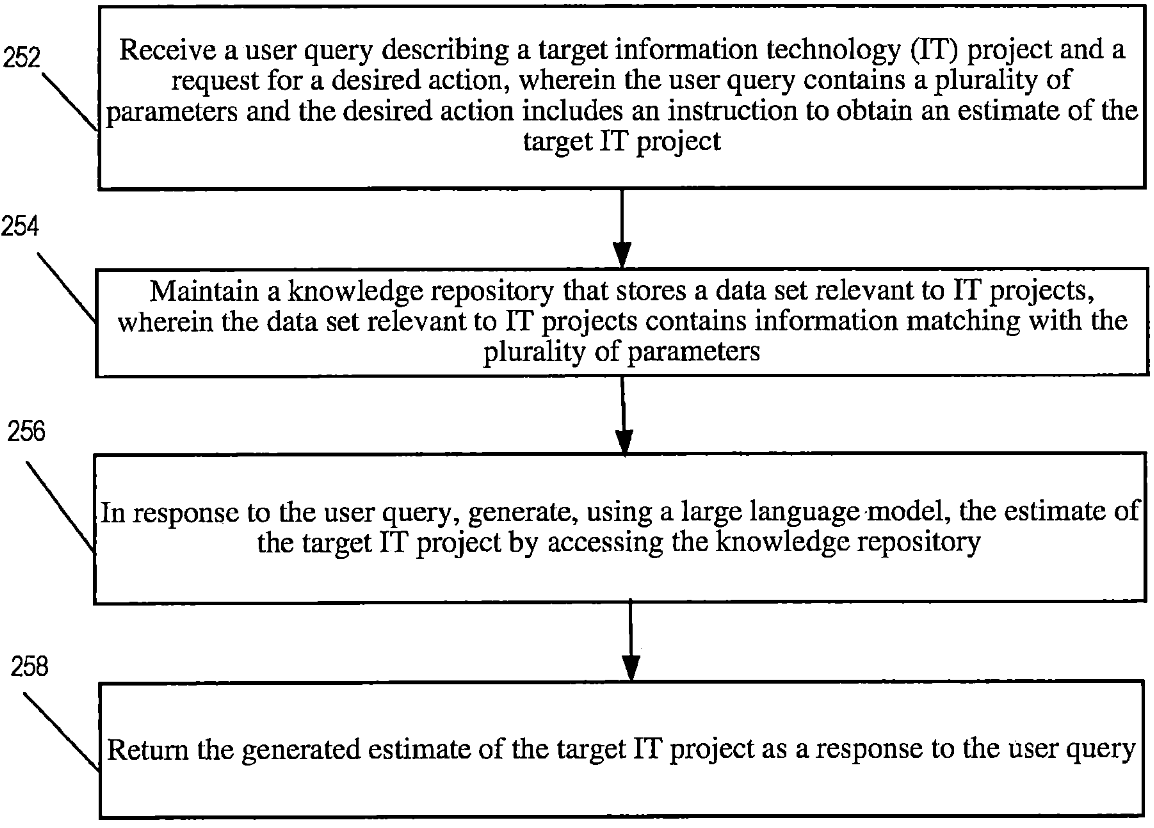
FIG. 2F depicts an illustrative embodiment of a method in accordance with various aspects described herein.

FIG. 2F depicts an illustrative embodiment of another method 250 in accordance with various aspects described herein. The method 250 includes receiving a user query describing a target information technology (IT) project and a request for a desired action, where the user query contains a plurality of parameters and the desired action includes an instruction to obtain an estimate of the target IT project (Step 252), maintaining a knowledge repository that stores a data set relevant to IT projects, wherein the data set relevant to IT projects contains information matching with the plurality of parameters (Step 254), in response to the user query, generating, using a large language model, the estimate of the target IT project by accessing the knowledge repository (Step 256), and returning the generated estimate of the target IT project as a response to the user query (Step 258).

In various embodiments, the generating the estimate of the target IT project further comprise decoding the received user query in a natural language form, where the plurality of parameters includes applications to be impacted, a prior IT project relevant to the target IT project, a system to be impacted, a type of task or a combination thereof. The accessing the knowledge repository further comprise searching the knowledge repository and retrieving the information matching with the plurality of parameters from the knowledge repository. The data set relevant to IT projects are categorized into at least system information, requirement documentation, financial information, and historical information. The accessing the knowledge repository further comprise searching into and retrieving the information matching with the plurality of parameters from one or more of system information, requirement documentation, financial information, and historical information.

In various embodiments, the method 250 further comprises automating generation of a prompt or instructions to be provided to the large language model as input by guiding the user query to provide the plurality of parameters. The method 250 further comprises receiving a periodic ingesting of at least system information, requirement documentation, financial information, historical information or a combination thereof into the knowledge repository.

Figure 2G:
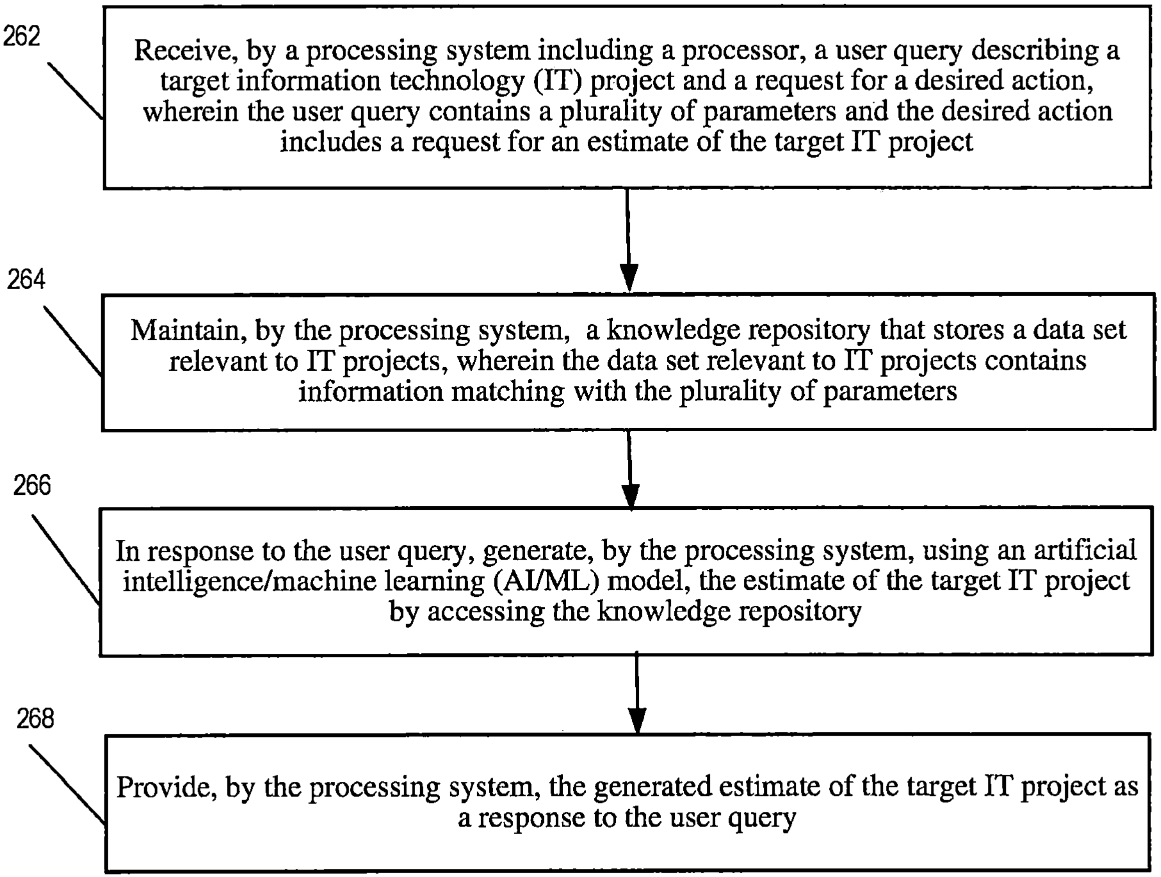
FIG. 2G depicts an illustrative embodiment of a method in accordance with various aspects described herein.

FIG. 2G depicts an illustrative embodiment of yet another method 260 in accordance with various aspects described herein. In various embodiments, the method 260 includes receiving, by a processing system including a processor, a user query describing a target information technology (IT) project and a request for a desired action, wherein the user query contains a plurality of parameters and the desired action includes a request for an estimate of the target IT project (Step 262), maintaining, by the processing system, a knowledge repository that stores a data set relevant to IT projects, wherein the data set relevant to IT projects contains information matching with the plurality of parameters (Step 264), in response to the user query, generating, by the processing system, using an artificial intelligence/machine learning (AI/ML) model, the estimate of the target IT project by accessing the knowledge repository (Step 266), and providing, by the processing system, the generated estimate of the target IT project as a response to the user query (Step 268).

The generating the estimate of the target IT project further comprise encoding and decoding, by the processing system, the received user query in a natural language form to be provided to the AI/ML model as input, and in response to the user query in the natural language form, generating, by the processing system, the estimate of the target IT project as output, using a large language model as the AI/ML model. The accessing the knowledge repository further comprise searching the knowledge repository and retrieving the information matching with the plurality of parameters from the knowledge repository. The data set relevant to IT projects are categorized into at least system information, requirement documentation, financial information, and historical information. The accessing the knowledge repository further comprise searching into and retrieving the information matching with the plurality of parameters from one or more of system information, requirement documentation, financial information, and historical information.

The method 260 further comprising automating, by the processing system, generation of a prompt or instructions to be provided to the AI/ML model as input by guiding the user query to provide the plurality of parameters via a chatbot interface. The method 260 further comprises receiving, by the processing system, a periodic ingesting of at least system information, requirement documentation, financial information, and historical information into the knowledge repository. The method 260 further comprises training, by the processing system, the AI/ML model using system information, requirement documentation, financial information, and historical information. The system information comprises information relating to database schema, client applications, application codes, application programming interfaces (APIs), user interfaces or a combination thereof. The requirement documentation further comprises user stories, interface documents, design documents, interface documents, or a combination thereof, and the historical information further comprises historical project estimates and historical project actuals.

While for purposes of simplicity of explanation, the respective processes are shown and described as a series of blocks in FIGS. 2E through 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In the above-described embodiments, development of the AI/ML tool to estimate software delivery costs can greatly transform and simplify efforts of project managers. These benefits will not only contribute to the success of individual projects, but also provide a competitive advantage to the entire organization. Benefits of the use of the AI/ML tool in the estimation process include increased accuracy as AI models can analyze large amounts of historical project data and artifacts to make more accurate predictions about the costs associated with an upcoming IT project.

By learning from past successes and failures, the AI/ML tool can identify patterns that impact project costs; this will reduce a likelihood of underestimations and overestimations that may occur in current processes. Efficiency and speed may improve as the implementation of the AI/ML tool in the project estimation process will allow project managers to turn around cost estimates in a timelier manner. The conventional estimation process may take weeks or months to complete. Use of this AI/ML tool will likely provide a competitive advantage through improving time to market by reducing the startup times for projects. Resource optimization may be achieved by more accurately estimating project costs, company leadership will be in a better position to allocate and staff resources to key projects and initiatives. Continuous improvement can be facilitated as AI models can continuously learn or dynamically adjust predictions based on new data. Technical development efficiency may improve to increase the productivity of IT development teams by providing teams a head start on the design/implementation for a project.

Figure 3:
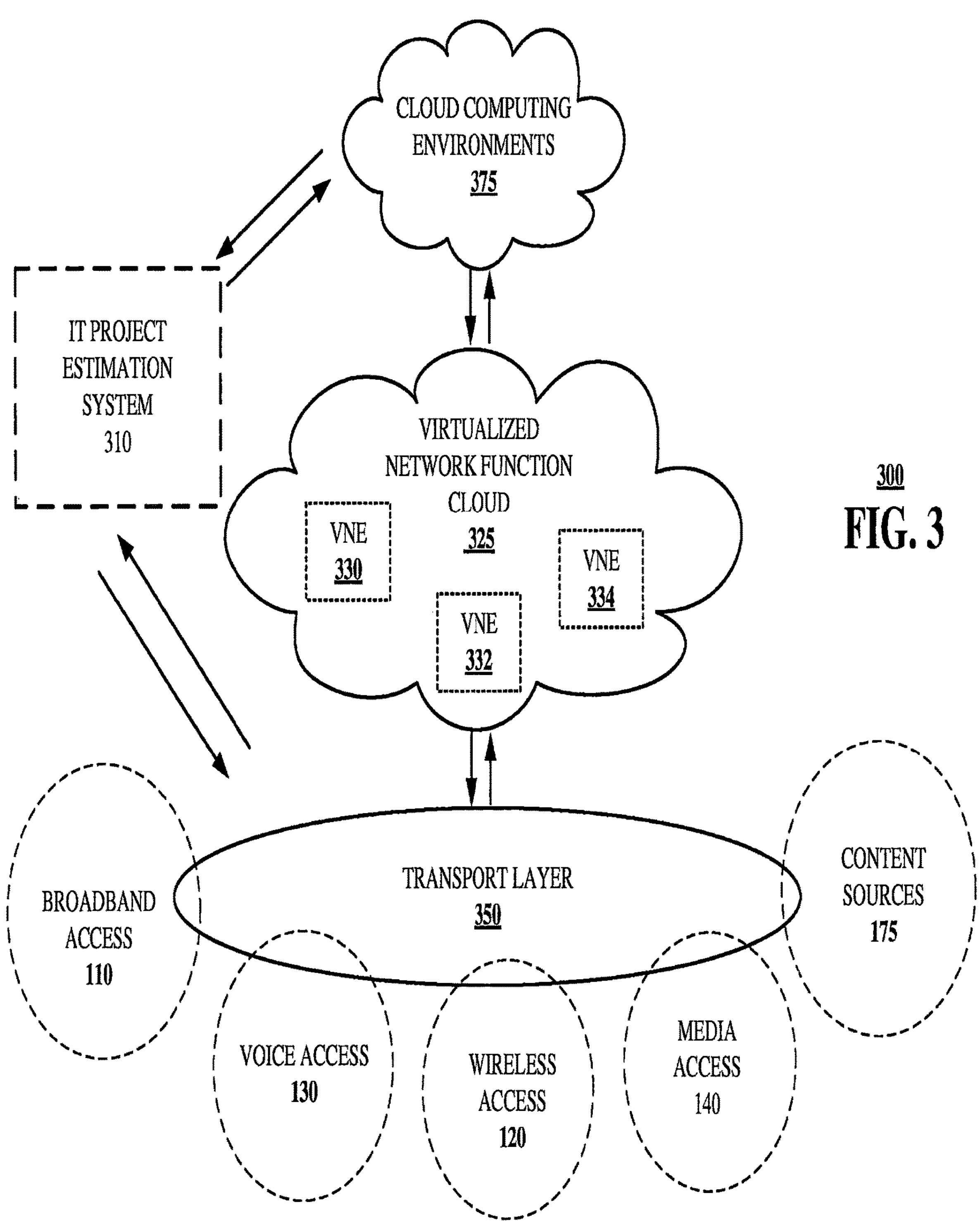
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 210, 230, 240, 250 and 260 presented in FIGS. 1, 2B, 2C, 2D, 2E through 2G and 3. For example, virtualized communication network 300 can facilitate in whole or in part systems and methods for automating generation of information technology (IT) project estimates using artificial intelligence/machine learning techniques.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations. Additionally or alternatively, the cloud computing environments 375 host various different artificial intelligence foundation models provided and offered by various enterprises such that an IT project estimation system 310 can select and utilize one or more of AI models hosted by the cloud computing environments 375.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
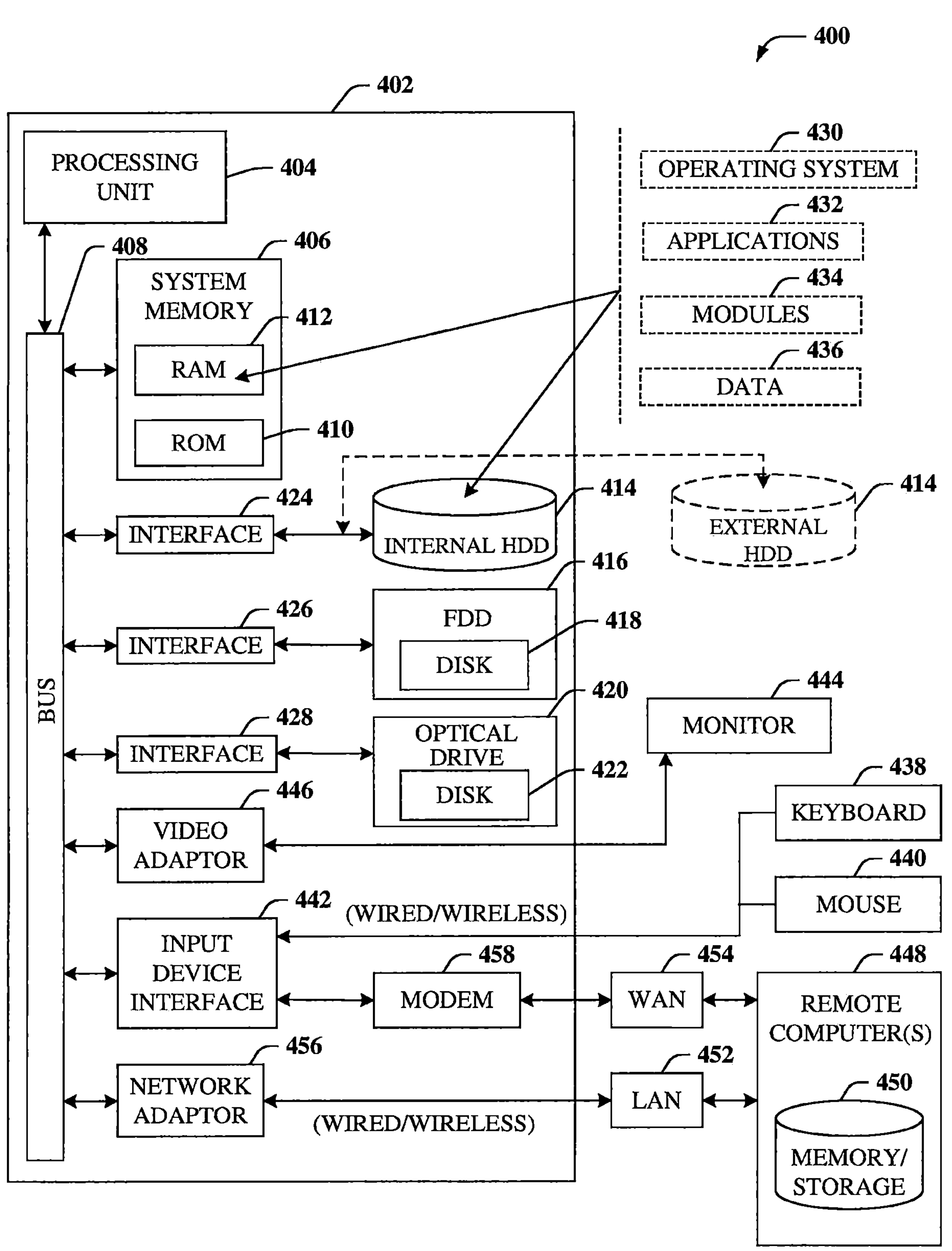
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part systems and methods for automating generation of information technology (IT) project estimates using artificial intelligence/machine learning techniques.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
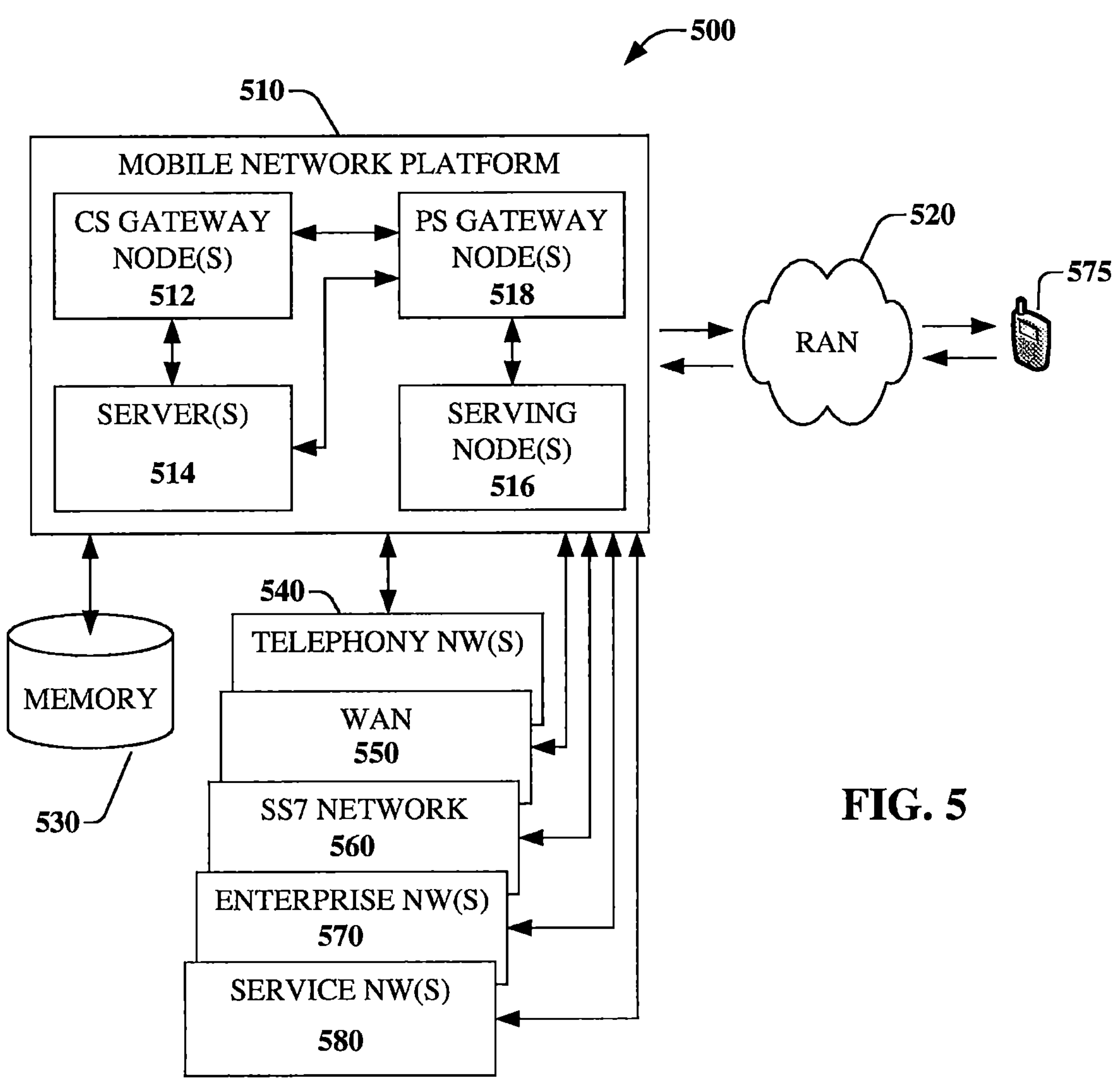
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part systems and methods for automating generation of information technology (IT) project estimates using artificial intelligence/machine learning techniques. In one or more embodiments, the mobile network platform 510 can generate and receive signals transmitted and received by base stations or access points such as base station or access point 122.

Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
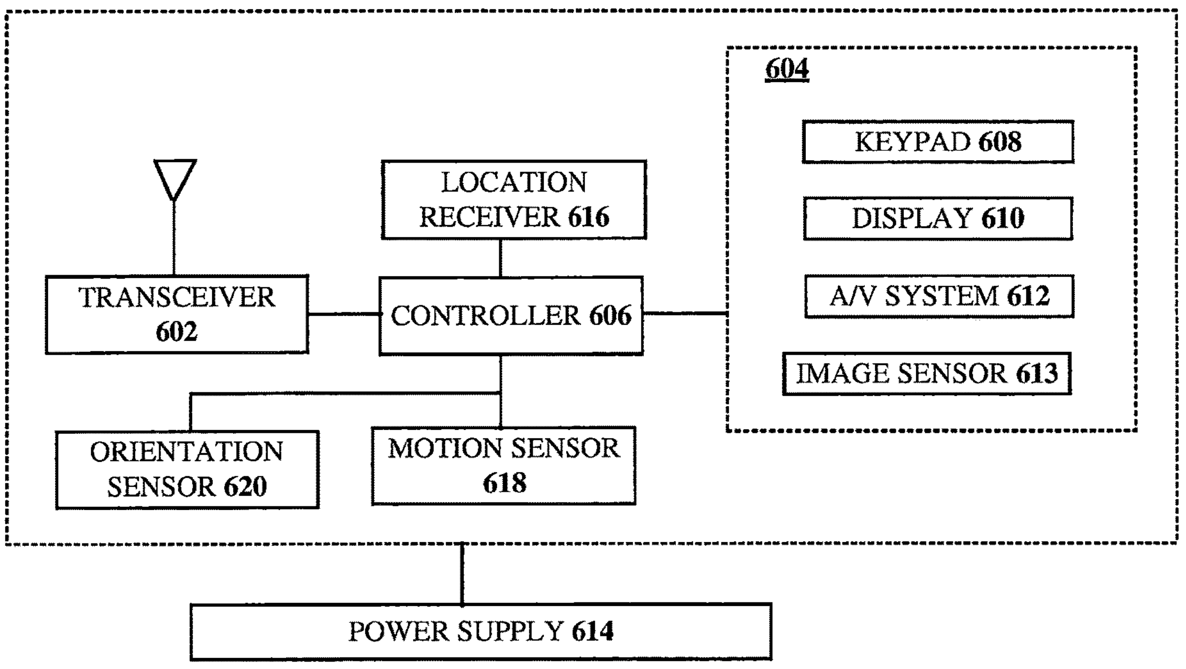
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part systems and methods for automating generation of information technology (IT) project estimates using artificial intelligence/machine learning techniques.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=\text{confidence}(\text{class})$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving a user query describing a target information technology (IT) project and a request for a desired action, wherein the desired action includes obtaining an estimate of the target IT project;

via a presentation layer that implements a chatbot interface and includes predetermined logic, prompting a user for additional information to collect data necessary for the target IT project when the user query does not include the data necessary for the target IT project;

maintaining a knowledge repository that stores a data set relevant to IT projects, wherein the data set relevant to IT projects includes at least system information, requirement documentation, financial information, and historical information;

training an artificial intelligence/machine learning (AI/ML) model with a training data set which includes at least a subset of the data set relevant to IT projects;

identifying and extracting, by a large language model of the trained AI/ML model, pertinent information from the user query, wherein the pertinent information identifies an application, a field, a database, and a component associated with the target IT project;

constructing, using the trained AI/ML model, the estimate of the target IT project by using the data set relevant to IT projects stored in the knowledge repository, wherein the constructing the estimate of the target IT project further comprises:

determining, using the pertinent information and accessing the system information stored in the knowledge repository, one or more applications to be impacted by the target IT project;

performing, in an automated sequence following the determining the one or more applications to be impacted by:

scanning code segments, using the system information comprising application codebases and database schema information, that reference one or more fields to be impacted for the one or more applications to be impacted;

determining, based on results of the scanning and the requirement documentation, (i) one or more code modules, database schema objects, API/interface definitions, or user interface elements that reference the one or more fields, and (ii) one or more modifications to the one or more code modules, database schema objects, API/interface definitions, or user interface elements to implement the target IT project in connection with the one or more applications to be impacted; and determining, based on interface documents of the requirement documentation, where information associated with the one or more fields is sent and which other applications are impacted;

providing information from the automated sequence as a feedback in the determining of the one or more applications to be impacted by the target IT project; and generating the estimate of the target IT project by performing, in an automated sequence; finding relevant previous estimates, with respect to the determined one or more applications to be impacted, by searching a historical IT project estimate database and a historical actual cost database; determining resources and labor spent in the relevant previous estimates; and computing the estimate of the target IT project by using cost rates and vendor rates stored in a financial information database; and returning the generated estimate of the target IT project as a response to the user query, wherein the generated estimate includes an application list with impacts identifying areas expected to be changed, wherein the impacts identifying areas expected to be changed comprise one or more of modules, interfaces, database, and user interfaces, and the application list further includes applications delivery use cases and a cost estimate including a cost range.

2. The device of claim 1, wherein the system information comprises information relating to database schema, client applications, application codes, application programming interfaces (APIs), user interfaces or a combination thereof; and wherein the generating the estimate of the target IT project further comprises determining one or more applications impacted in the target IT project based on the system information.

3. The device of claim 1, wherein:

the requirement documentation further comprises user stories, interface documents, design documents, interface documents, or a combination thereof; and the historical information further comprises historical project estimates and historical project actuals.

4. The device of claim 3, wherein the generating the estimate of the target IT project further comprises:

identifying prior IT projects having a first predetermined similarity threshold to information included in the requirement documentation and reviewing tasks having performed in the identified prior IT projects; and identifying and reviewing prior estimates of the IT projects having a second predetermined similarity threshold to information included in the historical information.

5. The device of claim 1, wherein the financial information comprises cost rates and vendor rates; and wherein the generating the estimate of the target IT project further comprises calculating the estimate of the target IT project based on information included in the financial information.

6. The device of claim 1, wherein the user query is in a natural language form and the AI/ML model comprises a large language model.

7. The device of claim 1, wherein the receiving the user query further comprises receiving the user query via a chatbot interface such that a prompt to the AI/ML model is automatically generated via the chatbot interface.

8. A non-transitory machine-readable medium, comprising executable instructions that, when executed by a processing system of a user equipment including a processor, facilitate performance of operations, the operations comprising:

receiving a user query describing a target information technology (IT) project and a request for a desired action, wherein the user query contains a plurality of parameters and the desired action includes an instruction to obtain an estimate of the target IT project;

via a presentation layer that implements a chatbot interface and includes predetermined logic, prompting a user for additional information to collect data necessary for the target IT project when the user query does not include the data necessary for the target IT project;

maintaining a knowledge repository that stores a data set relevant to IT projects, wherein the data set relevant to IT projects contains information matching with the plurality of parameters, the information including at least system information, requirement documentation, financial information, and historical inform;

identifying and extracting, by a large language model, pertinent information from the user query, wherein the pertinent information identifies an application, a field, a database, and a component associated with the target IT project;

in response to the user query, constructing, using the large language model, the estimate of the target IT project by accessing the data set relevant to IT projects stored in the knowledge repository, wherein the constructing the estimate of the target IT project comprises:

determining, using the pertinent information and accessing the system information stored in the knowledge repository, one or more applications to be impacted by the target IT project;

performing, in an automated sequence following the determining the one or more applications to be impacted by:

scanning code segments, using the system information comprising application codebases and database schema information, that reference one or more fields to be impacted and one or more other fields likely to be impacted;

determining, based on results of the scanning and the requirement documentation, one or more code modules, database schema objects, API/interface definitions, or user interface elements that reference the one or more fields and one or more modifications to implement the target IT project;

determining, based on interface documents of the requirement documentation, applications to which information associated with the one or more fields is sent; and providing the determining the applications to be impacted; and generating the estimate of the target IT project by performing, in an automated sequence; finding relevant previous estimates, with respect to the determined one or more applications to be impacted, by searching a historical IT project estimate database and a historical actual cost database; determining resources and labor spent in the relevant previous estimates; and computing the estimate of the target IT project by using cost rates and vendor rates stored in a financial information database; and returning the generated estimate of the target IT project as a response to the user query, wherein the estimate includes an application list with impacts identifying areas expected to be changed, wherein the impacts identifying areas expected to be changed comprise one or more of modules, interfaces, database, and user interfaces, and the application list further includes a cost estimate including a cost range.

9. The non-transitory machine-readable medium of claim 8, wherein the generating the estimate of the target IT project further comprise decoding the received user query in a natural language form, wherein the plurality of parameters includes applications to be impacted, a prior IT project relevant to the target IT project, a system to be impacted, a type of task or a combination thereof.

10. The non-transitory machine-readable medium of claim 8, wherein the accessing the knowledge repository further comprise searching the knowledge repository and retrieving the information matching with the plurality of parameters from the knowledge repository.

11. The non-transitory machine-readable medium of claim 8, wherein the data set relevant to IT projects are categorized into at least system information, requirement documentation, financial information, and historical information; and wherein the accessing the knowledge repository further comprise searching into, and retrieving the information matching with the plurality of parameters from, one or more of system information, requirement documentation, financial information, and historical information.

12. The non-transitory machine-readable medium of claim 8, wherein the operations further comprise automating generation of a prompt or instructions to be provided to the large language model as input by guiding the user query to provide the plurality of parameters.

13. The non-transitory machine-readable medium of claim 8, wherein the operations further comprise receiving a periodically ingesting, at least system information, requirement documentation, financial information, historical information or a combination thereof, into the knowledge repository.

14. A method, comprising:

receiving, by a processing system including a processor, a user query describing a target information technology (IT) project and a request for a desired action, wherein the user query contains a plurality of parameters and the desired action includes a request for an estimate of the target IT project;

via a presentation layer that implements a chatbot interface and includes predetermined logic, prompting a user for additional information to collect data necessary for the target IT project when the user query does not include the data necessary for the target IT project;

maintaining, by the processing system, a knowledge repository that stores a data set relevant to IT projects, wherein the data set relevant to IT projects contains information matching with the plurality of parameters, the information including at least system information, requirement documentation, financial information, and historical information;

identifying and extracting, by a large language model of an artificial intelligence/machine learning (AI/ML) model, pertinent information from the user query, wherein the pertinent information identifies an application, a field, a database, and a component associated with the target IT project;

in response to the user query, constructing, by the processing system, using the AI/ML model, the estimate of the target IT project by accessing the data set relevant to IT projects stored in the knowledge repository, wherein constructing the estimate of the target IT project comprises:

determining, using the pertinent information and accessing the system information stored in the knowledge repository, one or more applications to be impacted by the target IT project;

performing, in an automated sequence following the determining the one or more applications to be impacted by:

scanning code segments, using the system information comprising application codebases and database schema information, that reference one or more fields to be impacted and one or more other fields likely to be impacted;

determining, based on results of the scanning and the requirement documentation, one or more code modules, database schema objects, API/interface definitions, or user interface elements that reference the one or more fields and one or more modifications to implement the target IT project;

determining, based on interface documents of the requirement documentation, applications to which information associated with the one or more fields is sent; and providing the determining the applications to be impacted; and generating the estimate of the target IT project by performing, in an automated sequence: finding relevant previous estimates, with respect to the determined one or more applications to be impacted, by searching a historical IT project estimate database and a historical actual cost database; determining resources and labor spent in the relevant previous estimates; and computing the estimate of the target IT project by using cost rates and vendor rates stored in a financial information database; and providing, by the processing system, the generated estimate of the target IT project as a response to the user query, wherein the estimate includes an application list with impacts identifying areas expected to be changed, wherein the impacts identifying areas expected to be changed comprise one or more of modules, interfaces, database, and user interfaces, and the application list further includes a cost estimate including a cost range.

15. The method of claim 14, wherein the generating the estimate of the target IT project further comprise:

encoding and decoding, by the processing system, the received user query in a natural language form to be provided to the AI/ML model as input; and in response to the user query in the natural language form, generating, by the processing system, the estimate of the target IT project as output, using a large language model as the AI/ML model.

16. The method of claim 14, wherein the accessing the knowledge repository further comprise searching the knowledge repository and retrieving the information matching with the plurality of parameters from the knowledge repository.

17. The method of claim 14, wherein the data set relevant to IT projects are categorized into at least system information, requirement documentation, financial information, and historical information; and wherein the accessing the knowledge repository further comprise searching into and retrieving the information matching with the plurality of parameters from one or more of system information, requirement documentation, financial information, and historical information.

18. The method of claim 14, further comprising automating, by the processing system, generation of a prompt or instructions to be provided to the AI/ML model as input by guiding the user query to provide the plurality of parameters via a chatbot interface.

19. The method of claim 14, further comprising receiving, by the processing system, periodically ingesting, at least system information, requirement documentation, financial information, and historical information, into the knowledge repository.

20. The method of claim 14, further comprising training, by the processing system, the AI/ML model using system information, requirement documentation, financial information, and historical information, wherein the system information comprises information relating to database schema, client applications, application codes, application programming interfaces (APIs), user interfaces or a combination thereof;

the requirement documentation further comprises user stories, interface documents, design documents, interface documents, or a combination thereof; and the historical information further comprises historical project estimates and historical project actuals.

* * * * *